United States Patent Office 3,340,167
Patented Sept. 5, 1967

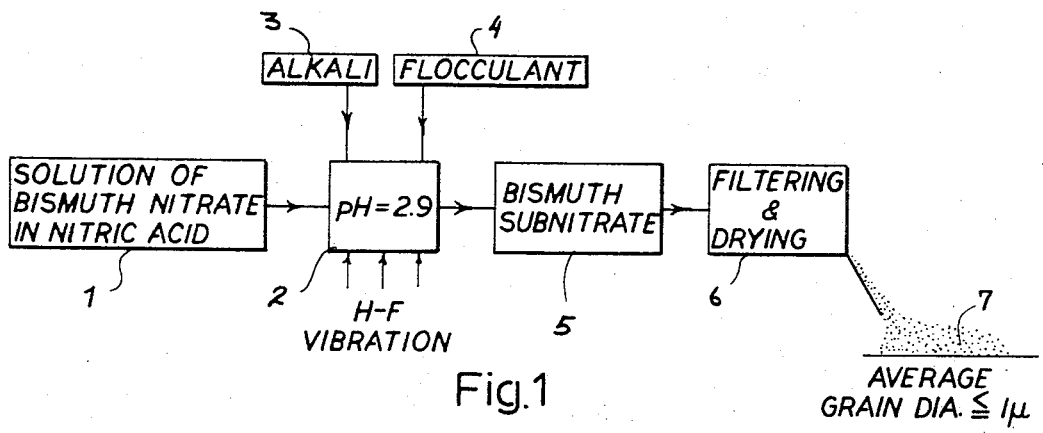
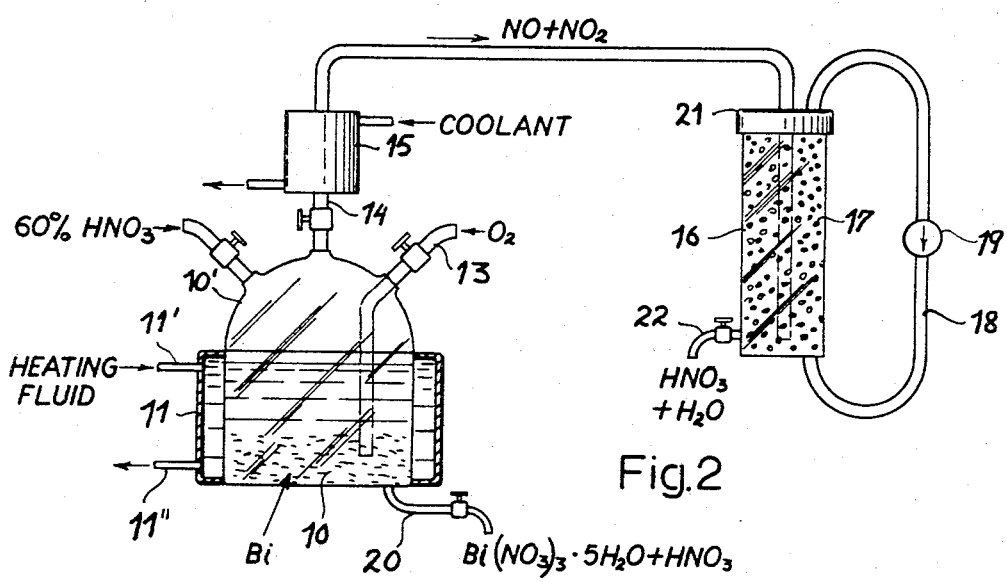

3,340,167
COMMINUTED BISMUTH SUBNITRATE AND
PROCESS FOR MAKING SAME
Gerardus Franciscus Koopman, Enschede, Netherlands,
assignor to N.V. v/h G. Koopman c.v., Enschede,
Netherlands, a corporation of the Netherlands
Filed Sept. 16, 1963, Ser. No. 309,212
Claims priority, application Netherlands, Sept. 14, 1962,
283,259
7 Claims. (Cl. 204—157.1)

ABSTRACT OF THE DISCLOSURE

Finely divided bismuth subnitrate for use in pharmaceutical preparations (with nodular particles of an average particle size up to one micron) for the treatment of gastric disorders, in cosmetics and in ceramics, and method of making the finely divided bismuth subnitrate wherein a solution of bismuth nitrate in nitric acid is subjected to high-frequency vibration upon being brought to a pH=2.9 and a flocculant to precipitate the bismuth subnitrate. The temperature is held between 60 and 70° C. and the vibration is continued until substantially all of the bismuth nitrate has been converted to bismuth subnitrate.

My present invention relates to bismuth subnitrate in finely divided form and to a process for its manufacture.

Bismuth subnitrate is an important ingredient in various pharmaceutical preparations, especially those used in the treatment of gastric disorders, and also has utility in the manufacture of cosmetics and ceramic substances. Its composition is variously given as $$BiO(OH) \cdot 4BiNO_3(OH)_2$$

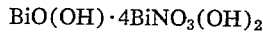

$Bi_2O_3 \cdot N_2O_5 + H_2O$ or $BiO \cdot NO_3 + H_2O$ (the two latter formulas being empirically equivalent). Thus, it is generly regarded not as a precisely defined compound but as a mixture of several basic salts with possible addition of bismuth hydroxide. Its principal constituent, bismuth trioxide ($Bi_2O_3$), may range between 79 and 82% by weight.

Conventional methods of producing bismuth subnitrate in comminuted form generally yield a powder of relatively coarse structure, composed of acicular particles of an average length of the order of 10 microns or more. It is known, on the other hand, that the therapeutic activity of comminuted substances depends largely on the available surface area which in turn varies inversely with the average particle diameter. Furthermore, from both the industrial and the medicinal viewpoints it is important to have a well-defined product of clearly reproducible composition and predictable characteristics.

The principal object of my invention is therefore to provide a bismuth subnitrate satisfying these requirements, along with a process for making the improved bismuth subnitrate.

A more specific object of the present invention is to provide a highly comminuted form of bismuth subnitrate which is better suited than conventional preparations of this type for incorporation in medications designed to treat gastric disorders, being neither so strongly acidic as to harm the stomach nor so extensively hydrolyzed as to be therapeutically ineffectual.

In accordance with this invention I prepare a solution of bismuth nitrate [$Bi(NO_3)_3 \cdot 5H_2O$] in nitric acid, this solution being of course strongly acidic, and subsequently admix with it an alkali while vibrating the solution at high frequency to homogenize the reaction, the mixing step being continued until the pH of the solution measures substantially 2.9. At this point a white powder begins to precipitate, this powder being almost amorphous in structure and consisting essentially of nodular particles with an average diameter of about 1 micron or less. After the precipitate has been filtered from the solution, washed and dried, its content in bismuth trioxide is found to be 81% by weight; the supernatant liquor separated from the filtrate is practically free from bismuth compounds.

The vibration of the solution should be carried out in such manner as to avoid the formation of air inclusions, this being best accomplished with the aid of a plate-type agitator (also known as "Vibromixer") as described for example in Dutch Patent No. 75,460. The mixer, on being immersed in the solution and operated at a frequency on the order of several kilocycles per second, will be found to vibrate the surrounding liquid in all directions without giving rise to air bubbles therein.

In accordance with a more specific feature of my invention, a flocculant is added to the solution upon attainment of the aforestated pH value of 2.9 to promote sedimentation. Vibration is continued until substantially all the bismuth has precipitated in subnitrate form.

The alkali admixed with the nitric-acid solution of bismuth nitrate may be an aqueous medium, e.g. a concentrated solution of sodium (or potassium) hydroxide or carbonate, or a gaseous agent such as ammonia.

Reference will now be made to the accompanying drawing in which:

FIG. 1 is a flow diagram showing the conversion of bismuth nitrate into bismuth subnitrate by the process according to this invention; and FIG. 2 illustrates schematically an advantageous method or preparing the starting solution of bismuth nitrate.

In FIG. 1 the preparation of a solution of bismuth nitrate and nitric acid takes place in container 1. The solution is then mixed in a vessel 2 with alkali from a receptacle 3 while being subjected to high-frequency vibration, a flocculant being subsequently added from a supply 4 as soon as the pH of the solution in vessel 2 has reached the value of 2.9. The precipitated bismuth subnitrate, indicated at 5, is aspirated from the solution and filtered, washed and dried at 6. The resulting powder, with an average grain diameter of not more than $1\mu$, is shown at 7.

In FIG. 2 I have shown a system for producing the starting solution for the process of FIG. 1. A flask 10 with a heating jacket 11 has a lid 10' carrying two inlet ducts 12, 13 and an outlet duct 14 leading through condenser 15 to an absorption tower 16 filled with Raschig rings 17. Water is circulated through tower 16 via a conduit 18 and a pump 19. Jacket 11 has an inlet 11' and an outlet 11" for the passage of a heating fluid; condenser 15 similarly has an inlet 15' and an outlet 15" for the circulation of a cooling medium. Flask 10 has a bottom tap 20 for the discharge of the solution of bismuth nitrate produced therein; absorption tower 16 is provided with a lid 21 and with a drain 22 from which regenerated nitric acid may be recovered.

Example 6 kg. of metallic bismuth chips of high purity (99.99%) is deposited in the flask 10 whereupon the lid 10' is closed. Nitric acid in a concentration of 60% is gradually added, in a total quantity of 12 liters, to the flask 10 by way of its inlet 12, thus initiating a violent exothermic reaction. Oxygen is bubbled through the flask via inlet duct 13, thereby agitating the solution and promoting the partial conversion of the evolving nitrous oxide (NO) into nitric oxide ($NO_2$). The gases $NO + NO_2$, traversing the condenser 15 by way of conduit 14, reach the absorption tower 16 in which water in a quantity of 11 liters is circulated by means of pump 19. The water interacts with the gases to form nitrous and nitric acid, the nitrous acid being subsequently also converted to nitric acid by the continuing influx of oxygen from supply duct 13.

The development of reaction heat gradually subsides in the course of one hour whereupon the heating jacket 11 is supplied with fluid to maintain the temperature of the solution at a value of about 65° C. At this time it will also be advantageous to replace the oxygen stream through inlet 13 with air. The completion of the reaction is indicated by a reddish-brown color assumed by the liquor in flask 10.

By this time, the concentration of nitric acid in the circulatory system 16, 18 has reached a value of 40 to 50% of the quantity originally admitted at inlet 12, thus enabling a recovery of close to half the amount of this acid.

The flask 10 of FIG. 2 may be regarded as the container 1 of the system of FIG. 1, its contents being transferred in their heated state to the reaction vessel 2; the concentration of bismuth nitrate in the nitric-acid solution is about 40 to 50% by weight at this point. Prior to the transfer, 2 liters of distilled water had been added to the solution to prevent crystallization of the bismuth nitrate. Next, a 30% aqueous solution of sodium hydroxide is slowly introduced as the alkali from the receptacle 3 in FIG. 1; the total quantity of this alkali is about 34 liters. Since the reaction in vessel 2 is also exothermic, the final temperature of the liquor will be around 65° C. even without intermediate reheating by external means. When the desired pH of 2.9 has been reached, a flocculant is added in an amount of a fraction of 1%, by weight, of the solution to promote precipitation; a surface-active agent suitable for this purpose is high-molecular-weight polyacrylamide (molecular weight of about 1,000,000) commercially available under the name "Separan." When sedimentation stops, the vibrations are discontinued preparatory to recovery of the precipitate as previously described.

The bismuth chips used with the arrangement illustrated in FIG. 1 should be of such size as not to be entrainable by the rising gas stream during the violent initial stage of the reaction. Such chips can be readily produced by quenching molten bismuth in a body of cold water, the average size of the chips (whose optimum is dictated by the parameters of the reactor) being determined by the metal temperature and the quantity of water.

The final product may be used for industrial purposes, as a starting material in the production of organic bismuth compounds, or as an ingredient of pharmaceutical preparations with antacid effect. In the latter case it will be desirable to admix the produced bismuth subnitrate with a therapeutic vehicle of antispasmodic character such as licorice extract, belladonna, meprobamate, or various valerian derivatives, as more fully described in my copending application Ser. No. 309,073 of even date, preparatory to molding the mixture into pills, tablets, lozenges or the like.

I claim:

1. A process for producing highly comminuted bismuth subnitrate, comprising the steps of preparing a solution of bismuth nitrate in nitric acid, admixing an alkali with said solution while vibrating the solution at high frequency until the pH of said solution has reached a value of substantially 2.9, continuing the vibration until substantially all bismuth nitrate in the solution has been converted to bismuth subnitrate forming a precipitate therein, and recovering said precipitate.

2. A process for producing highly comminuted bismuth subnitrate, comprising the steps of preparing a solution of bismuth nitrate in nitric acid, admixing an alkali with said solution while vibrating the solution at high frequency until the pH of said solution has reached a value of substantially 2.9, thereupon admixing a flocculant with the solution, continuing the vibration until substantially all bismuth nitrate in the solution has been converted to bismuth subnitrate forming a precipitate therein, and recovering said precipitate.

3. A process for producing highly comminuted bismuth subnitrate, comprising the steps of preparing a solution of bismuth nitrate in nitric acid, admixing an alkali with said solution while omnidirectionally vibrating the solution at high frequency with avoidance of air inclusions until the pH of said solution has reached a value of substantially 2.9, continuing the vibration until substantially all bismuth nitrate in the solution has been converted to bismuth subnitrate forming a precipitate therein, and recovering said precipitate.

4. A process for producing highly comminuted bismuth subnitrate, comprising the steps of preparing a solution substantially 40 to 50%, by weight, of bismuth nitrate in nitric acid, admixing an alkali with said solution at a temperature ranging between substantially 60 and 70° C. while vibrating the solution at high frequency until the pH of said solution has reached a value of substantially 2.9, continuing the vibration until substantially all bismuth nitrate in the solution has been converted to bismuth subnitrate forming a precipitate therein, and recovering said precipitate.

5. A process for producing highly comminuted bismuth subnitrate, comprising the steps of preparing a solution of bismuth nitrate in nitric acid, admixing an alkali with said solution while omnidirectionally vibrating the solution at high frequency with avoidance of air inclusions until the pH of said solution has reached a value of substantially 2.9, thereupon admixing a flocculant with the solution, continuing the vibration until substantially all bismuth nitrate in the solution has been converted to bismuth subnitrate forming a precipitate therein, and recovering said precipitate.

6. A process for producing highly comminuted bismuth subnitrate, comprising the steps of preparing a solution substantially 40 to 50%, by weight, of bismuth nitrate in nitric acid, admixing an alkali with said solution at a temperature ranging between substantially 60 and 70° C. while omnidirectionally vibrating the solution at high frequency with avoidance of air inclusions until the pH of said solution has reached a value of substantially 2.9, thereupon admixing a flocculant with the solution, continuing the vibration until substantially all bismuth nitrate in the solution has been converted to bismuth subnitrate forming a precipitate therein, and recovering said precipitate.

7. The product made by the process of claim 1.

References Cited

UNITED STATES PATENTS 3,222,231    12/1965    Markels et al. _____ 204—157.1

OTHER REFERENCES

American Chemical Journal, vol. 25 (1901), p. 307.

HOWARD S. WILLIAMS, *Primary Examiner.*